(12) United States Patent
Morris et al.

(10) Patent No.: US 6,283,275 B1
(45) Date of Patent: Sep. 4, 2001

(54) SCREW AND APPARATUS USING SAME FOR CONVEYING WET SOLIDS

(75) Inventors: C. Edward Morris, Basking Ridge, NJ (US); Pieter Hoogendonk, Giessen (NL)

(73) Assignee: American Bulk Conveying Syst., Murray Hill, NJ (US)

( * ) Notice: Subject to any disclaimer, the term of this patent is extended or adjusted under 35 U.S.C. 154(b) by 0 days.

(21) Appl. No.: 09/330,765

(22) Filed: Jun. 11, 1999

Related U.S. Application Data

(60) Provisional application No. 60/124,416, filed on Mar. 15, 1999.

(51) Int. Cl.[7] ................................................ B65G 33/26
(52) U.S. Cl. ............................................................. 198/677
(58) Field of Search ................................... 198/677, 676, 198/674, 675, 657

(56) References Cited

U.S. PATENT DOCUMENTS

| | | | | |
|---|---|---|---|---|
| 349,390 | * | 9/1886 | Gilbert et al. ........................ | 198/677 |
| 455,384 | * | 7/1891 | Birkholz ................................ | 198/677 |
| 1,053,645 | * | 2/1913 | Reimer .................................. | 198/677 |
| 4,164,470 | * | 8/1979 | Briltz .................................... | 198/677 |
| 4,872,546 | * | 10/1989 | Hindermann ......................... | 198/677 |
| 5,000,307 | * | 3/1991 | Bruke ................................... | 198/608 |
| 5,054,658 | * | 10/1991 | Aronie .................................. | 198/676 |
| 5,875,882 | * | 3/1999 | Pollock ................................. | 198/677 |

\* cited by examiner

*Primary Examiner*—Christopher P. Ellis
*Assistant Examiner*—Khoi H. Tran
(74) *Attorney, Agent, or Firm*—Hopgood, Calimafde, Judlowe & Mondolino

(57) ABSTRACT

The invention provides a combination shafted and shaftless screw, and an apparatus and method for conveying wet solids using the screw.

10 Claims, 1 Drawing Sheet

SCREW AND APPARATUS USING SAME FOR CONVEYING WET SOLIDS

This application is based on provisional application Ser. No. 60/124,416, filed Mar. 15, 1999, the disclosure of which is incorporated herein by reference.

BACKGROUND

1. Field of the Invention

This invention relates to a novel screw construction having both a shafted portion and a shaftless portion. The shafted portion includes a torque limiter tube and tension rod in the center of the spiral of a vertical or steeply inclined shaftless screw conveyor for conveying wastewater treatment solids and other types of wet and/or sticky solids. This invention also relates to an improved vertical or steep inclined shaftless screw conveyor by increasing the permissible capacity and permitting longer conveyor lengths using the novel screw construction.

2. State of the Art

Solids can be conveyed vertically, up steep inclines, with both conventional shafted screw conveyors and standard shaftless screw conveyors. However, vertical or steeply inclined conveying (greater than 60-degrees from the horizontal) presents problems for both technologies (types of screws). Conventional shafted screw conveyors require high rotational speeds to convey the material; the result of high speed is increased shear, and wet solids material sometimes becomes thixotropic (i.e., thickens) and/or sticks to the screw, which decreases system capacity. The spiral within standard shaftless screw conveyors used in vertical or steep incline situations can easily become unevenly loaded, causing stresses on portions of the screw greater than the safe design load of the screw metal material and thus deforming (and ruining) the screw.

More particularly, it has been found that when the frictional forces between the auger and product ($P_{pa}$) are significantly less than the frictional forces between the tube and product ($F_{pt}$), the product will convey. Thus, when the relative friction ($F_r = F_{pa}/F_{pt}$) between the auger and the tube is significantly less than one (1), the product will convey vertically. Conversely when the relative friction ($F_r$) is close to or equal to one (1) the product will not convey vertically.

The relative frictional force, $F_r$, has been found to be approximately proportional to the ratio of the surface area of the auger ($S_a$) (flights and center pipe to which it is welded) and the surface area of the tubular section ($S_t$), $F_r \approx S_a/S_t$. If $S_a \geq S_t$ then $F_{pa} \geq F_{pt}$ and the product will rotate with the auger and will not convey upwards. The relative frictional forces, $F_r$, between the auger and tubular section is therefore approximately proportional to the relative surface area between the auger Sa (flights and center pipe) and tube $S_t$ (i.e., $F_r \approx S_a/S_t$).

To convey vertically or on a high incline with a conventional screw or auger, higher rotational speeds of 40 to 100 RPM (revolutions per minute) and greater are used to create a greater centrifugal force, which "throws" material outward against the conveying tube and reduces the dynamic forces of friction between the auger and the product ($F_{pa}$), but not the frictional forces between the product and the tube ($F_t$). Under higher rotational speed $F_{pa}$ becomes significantly less than $F_{pt}$, thereby reducing the relative frictional forces ($F_r$) between the product/auger and product/tube.

Convention Shafted Screws

To convey wastewater solids (and/or other wet and/or sticky solids) with conventional shafted screw conveyors, the frictional force between the shafted screw and the wastewater solids must be significantly less than the frictional force between the conveyance tube (in which the screw conveyor is housed) and the conveyed solids. This condition permits the shafted screw to rotate through the conveyed solids moving the material up on the flights of the shafted screw. In situations when this frictional condition does not exist, the conveyed solids rotate with the screw (i.e., friction between the solids and the screw is high) and so the solids are not moved upward. Therefore, when the ratio between these two frictional forces is significantly less than one, the material can be conveyed vertically. This ratio is termed herein Relative Friction. Meeks (U.S. Pat. No. 1,906,395) shows a conventional shafted screw conveyor.

To achieve a Relative Friction which is significantly less than one, either the ratio between (i) the shafted screw and conveyed solids and (ii) the conveyance tube and the conveyed solids must be less than one and minimized to the greatest extent possible, or the rotational speed of the shafted screw must be increased. The physical construction of shafted screws does not permit the minimization of the surface area ratios and therefore the speed of the shafted screw must be increased. However, the increase in speed of the shafted screw results with the material conveyed changing its rheologic characteristics as it is overworked by the rotating screw (e.g., the material to be conveyed is dilatant or rheopectic). Such types of conveyed solids result in increased friction between the shafted screw and the material as the screw is rotated, significantly reduce the capacity of the system, can prevent conveyance totally, and/or are undesireable for their intended end use.

The center pipe around which the flights are attached in a conventional auger (screw) performs a stabilizing and strengthening function for the auger. The center pipe transmits the total product weight being conveyed (W) plus the axial friction load ($L_a$) and axial shear stresses ($A_s$) from the flights and evenly distributes these loads throughout the length of the auger to the drive shaft. The total force being transmitted is defined by ($F_{was}$)=(W)+$A_s$+$L_a$. The axial load ($A_s$) and axial shear stress ($L_a$) are a functions of and proportional to the frictional forces ($F_{pa}$) and ($F_t$) and the gravitational load or weight (W) of the spiral auger and product. The center shaft in a conventional screw prevents over-stressing through stretching (elongation) and distortion of the spiral flights. Small thickness (thin) flights are possible because of the center shaft of a conventional shafted screw conveyor.

Standard Shaftless Screws

Shaftless screw conveyors, which use centerless (shaftless) spirals to convey wet and/or sticky (e.g., wastewater) solids, are subject to three main stresses: stress due to torsional resistance; stress due to frictional resistance; and stress due to axial load of the material being conveyed. These stresses are all directly proportional to the angle of the conveyor which, as it increases to a steep incline or vertical conveyor, results in disproportionally high stresses at specific locations along the length of the spiral. These high stresses can result in spiral failure through elongation or breakage. Somers (U.S. Pat. No. 3,802,551) and Bruke (EP 333 682 A1) provide examples of shaftless screws.

Shaftless screws, augers without center pipes, have been used to reduce the surface area of the auger, $S_a$, relative to the surface area of the tube, $S_t$, thereby reducing $F_r$ as described above. The reduced $F_r$ has permitted lower rotational speeds, e.g., 20 RPM, thereby reducing significantly the degradation of the product.

A loading screw or push screw to feed product into the vertical screw is used as a necessary part of vertical or steep incline conveying. The product is then forced into the vertical screw forming a "plug" that compacts the product throughout the centerless void of the shaftless screw. The product remains compacted throughout the full length. This compaction force (Cf) results in an increase in both frictional forces $F_{pa}$ and $F_{pt}$ (and $A_s$ and $L_a$). The continued feeding of product, and plug forming due to centerless compaction and the upward pull of the shaftless spiral auger, propels the product upward.

Shaftless screws, by their very nature, have no center pipe to evenly distribute and transmit axial shear stresses ($A_s$), axial loads ($L_a$), product, and auger weight ($W_{pa}$) along the full length of the auger. Both $A_s$ and $L_a$ loads are increased by the degree of compaction. The full weight, axial load, and shear stresses ($W_{pa}L_a+A_s=F_{was}$) with a shaftless auger are transmitted successively along each pitch of auger, increasing proportionately along the length and is at the maximum at the top of the last spiral pitch. As a result, the entire load must be carried by the last top pitch of spiral and the last cubic inch of spiral; that is, $F_{as}=A_s+L_a$. The last cross sectional segment of the spiral auger at the top must therefore support the entire load ($F_{as}$).

The practical safe load carrying capability of the shaftless auger ($S_s$) is determined by its yield strength $F_y$ (pounds per square inch, psi) times the cross sectional area $A^2$ (square inches) times a safety factor ($K_s$). $S_s=F_y \times A^2 \times K_s$=safe load $S_s$ in pounds. If the full axial shear stresses and product weight $(W+L_s+A_s)=(F_{was})$ are greater than ($S_s$), the shaftless spiral auger will stretch excessively (elongate) and also will contract with each revolution. It is known that repeated stretching (elongating) and contraction of metal will result in metal fatigue, cracking, and failure. The number of cycles (elongation and contraction) possible before the metal fails depends on the ratio of the safe load ($S_s$) and the full load ($F_{as}$).

In light of the foregoing, it would be beneficial to provide an auger having the advantages of both the shafted and shaftless screws, but without the drawbacks associated with either.

SUMMARY OF THE INVENTION

In one embodiment this invention provides a screw for conveying solids, comprising a combination of a shafted portion and a shaftless portion; preferably the majority of the screw including the shaftless portion, and preferably the shafted portion is disposed vertically lower than the shaftless portion.

This invention also provides an apparatus for conveying solids, comprising a conveyor tube having an inlet and an outlet, a screw conveyor disposed in the tube generally from the inlet to the outlet, one portion of said screw conveyor being disposed near the inlet and having a shaft and another portion of the screw conveyor being shaftless, and means for driving the screw conveyor.

In yet another embodiment, this invention provides a method for conveying wet solids which comprises (i) providing a conveyor tube having an inlet and an outlet, the outlet being disposed vertically above the inlet, (ii) providing in the conveyor tube a screw having a shafted portion adjacent the inlet and a shaftless portion adjacent the outlet, (iii) introducing wet solids into the inlet, (iv) turning the screw to convey the solids from the inlet to the outlet, and finally (v) removing solids from the outlet.

DETAILED DESCRIPTION OF SPECIFIC EMBODIMENTS OF THE INVENTION

Figure 1:
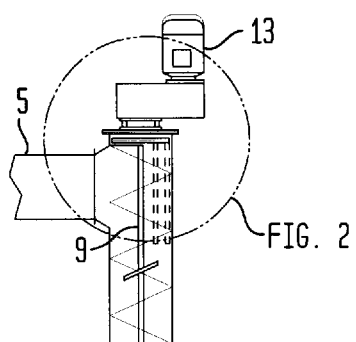
FIG. 1 depicts a screw conveyor according to the present invention with close-up portions of the inlet, the shaftless middle, and the outlet portions.
Figure 2:
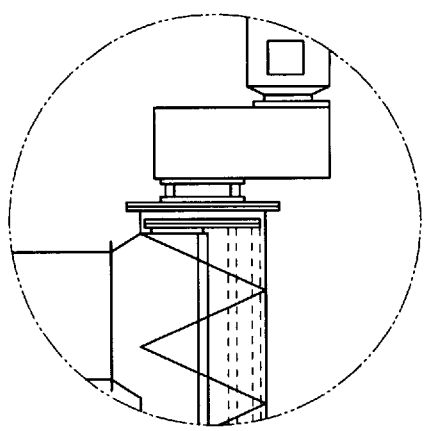
FIG. 2 to FIG. 4 are enlarged details of FIG. 1.
Figure 3:
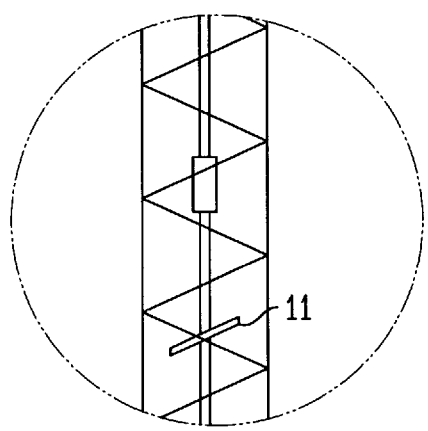
Figure 4:
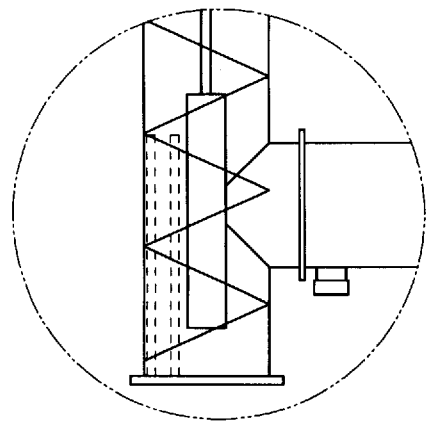

The present invention, which includes preferably the installation of a torque limiter tube and tension rod within a shaftless spiral of a steep incline or vertical conveyor, eliminates the problems experienced by both conventional shafted screw conveyors and standard shaftless screw conveyors. This invention combines the benefits of shaftless screws, with their ability to limit the friction between the spiral and the material, and shafted screws, with their ability to withstand high stress applications.

The torque limiter tube, which is installed in the lower end of the shaftless screw conveyor, is sized such that its length is approximately two pitch lengths of the shaftless screw, and preferably is about three inches in diameter. This tube is welded to the lowest point of the spiral and the tension rod. The tension rod is sized based upon the diameter and length of the spiral and the density of the material being conveyed. The tension rod runs the full length of the spiral from the torque limiter tube to the drive end of the spiral.

As the conveyed solids are pushed into the steep inclined or vertical conveyor, a plug of material is formed around the torque limiter tube. Once the conveyed solids are raised above the torque limiter tube, they freely fall into the center space created at the end of the torque limiter tube in a shaftless portion of the conveyor screw. This arrangement reduces the torsional stress experienced in the lower pitches of the shaftless spiral. The tension rod reduces the stresses in the spiral flights because the axial load of the material being conveyed is supported in the shaftless spiral at several location along it length.

Our invention combines the benefits of the vertical shaftless spiral auger and the conventional spiral auger. It employs (i) a torque limiter lower center tube that may be the full inside spiral diameter to reduce the frictional forces due to compaction and (ii) a full length tension rod, not full diameter, rigidly attached to the drive coupling plate and at intermediate points to the shaftless spiral auger along the spiral length. For best results, the torque limiter tube is of a length approximately equal to 11/2 to 2 pitch lengths (preferably 18" to 36"). The invention also employs a feed screw.

The incoming product from the feed screw forms a "plug" by compaction around the torque limiter tube. As the product is lifted above the torque limiter tube, the product is no longer confined to the space between the center torque tube and the outside conveying tube. Thus, the product falls freely into the center void created at the end of the torque limiter tube, where the shaftless screw begins, thereby reducing the compaction force ($C_f$) and the proportional frictional forces ($F_{pA}$) and ($F_{pt}$). The full load ($F_{was}$) is reduced as the axial load ($L_a$) and axial shear stress load ($A_s$), which are proportional to frictional forces ($F_{pa}$) and ($F_{pt}$), are reduced for the remaining full length above the torque limiter tube.

The tension rod is of a smaller diameter than the inside spiral diameter and is the entire length of the high incline or vertical tube transmits. It distributes the reduced and remaining Full Force ($F_{was}$) throughout the spiral auger length to the drive coupling plate. The tension rod significantly limits the stretch (elongation) of the shaftless spiral and transmits the full load ($F_{was}$) away from the shaftless spiral auger to the drive coupling plate.

Turning to FIG. 1, an idealized overview cross-section of a vertical conveyor using the present invention, the conveyor includes an inlet 1, the linear conveyor tube 3 in which the screw is housed, and an outlet 5. The lower portion of the screw has the torque limiter 7 in the shafted portion, and a tension rod 9 in the upper, shaftless portion of the screw. The shaftless screw is attached to the tension rod by spaced, radial spoke attachments 11, preferably spaced every meter or two (e.g., every three to five feet) from each other along the tension rod. The screw is turned by an engine 13, preferably an electric motor, optionally through a transmission or other gearing system.

The material conveyed by this type of apparatus is generally any type of solid, although typically the solid will be able to absorb a certain amount of water. Wastewater solids that have been pressed and then conveyed vertically with an auger-type device typically have a solids content of 20–30 percent by weight. These types of solids materials are drier than a typical slurry (e.g., 40+ vol. % solids). Typically power requirements for the motor for conveying these types of solids are about 10 Hp for 10 feet of 90° vertical elevation. For a 12" screw auger (280 mm diameter), the throughput for such solids is about 580 ft.$^3$/hr.; for a 20" screw auger (460 mm diameter), the throughput is about 2700 ft.$^3$/hr.

In operation, a wet feed comprising solids and liquid is fed in through the inlet, the feed is typically provided by a feed screw (not shown). At the bottom of the conveyor tube, where the material enters, it is compacted, and thus the required torque is the greatest. Accordingly the torque limiter tube is provided in the center of the screw. Because the diameter of the torque limiter is fairly small compared with the diameter of the conveyor, the amount of torque transferred to the wet feed is limited. As the wet feed is conveyed upwards, it encounters the shaftless screw portion above the torque limiter; that is, the section with the tension rod disposed within the center of the helical screw conveyor. In this section of the conveyor tube, the material also "expands" to fill the shaftless center of the screw. As the material is conveyed upwards, some of the material falls to the shaftless center of the screw and becomes loosely packed along the length of the tension rod. Thus, the material may fall one or two pitches in the shaftless center, and then re-engage and screw to be conveyed vertically to the top in this loosely packed form. At the top of the tube, the material is forced to the outlet and can be conveyed elsewhere by, for example, another auger.

While the conveyor has been shown and described disposed vertically, this invention is useful for conveying wet solids in any direction, although it is most advantageously used when conveying wet product to a higher elevation (e.g. the conveyor tube can be disposed at an angle).

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A screw for conveying solids, comprising a combination of a shafted portion and a shaftless portion, said shaftless portion further comprising (i) a tension rod extending from the shaft of the shafted portion of the screw to which the shaftless portion is attached through to the other end of the shaftless portion and (ii) a plurality of spokes extending radially from the tension rod and connecting the tension rod to the flight of the shaftless portion.

2. The screw of claim 1, wherein the shaftless portion is disposed vertically above the shafted portion.

3. The screw of claim 1, wherein the shafted portion comprises a torque limiter tube having a diameter greater than that of the tension rod.

4. An apparatus for conveying solids, comprising:
a conveyor tube having an inlet and an outlet;
a screw conveyor disposed in the tube generally from said inlet to said outlet, one portion of said screw conveyor disposed near said inlet having a shaft and another portion of the screw convey being shaftless, said shaftless portion comprising (i) a tension rod extended from the shaft of the shafted portion of the screw to which the shaftless portion is attached through to the other end of the shaftless portion and (ii) a plurality of spokes extending radially from the tension rod and connecting the tension rod to the flight of the shaftless portion; and
means for driving said screw conveyor.

5. The apparatus of claim 4, wherein the portion of the screw containing a shaft further comprises a torque limiter tube.

6. The apparatus of claim 4, wherein the apparatus is disposed so that the outlet is at an higher elevation than the inlet.

7. The apparatus of claim 4, wherein the means for driving the screw is an electric motor.

8. A method for conveying wet solids, comprising:
providing a conveyor tube having an inlet and an outlet, said outlet being disposed vertically above said inlet;
providing in said conveyor tube a screw having a shafted portion adjacent said inlet and a shaftless portion adjacent said outlet, said shaftless portion comprising (i) a tension rod extended from the shaft of the shafted portion of the screw to which the shaftless portion is attached through to the other end of the shaftless portion and (ii) a plurality of spokes extending radially from the tension rod and connecting the tension rod to the flight of the shaftless portion;
providing wet solids to said inlet;
turning said screw effective to convey said solids from said inlet to said outlet; and
removing solide from said outlet.

9. The method of claim 8, wherein the wet solids comprise wastewater solids.

10. The method of claim 8, wherein the solids are shear-thickening.

* * * * *